United States Patent
Chi et al.

(10) Patent No.: US 11,456,500 B2
(45) Date of Patent: Sep. 27, 2022

(54) BATTERY MODULE, BATTERY PACK INCLUDING BATTERY MODULE, AND VEHICLE INCLUDING BATTERY PACK

(71) Applicant: LG CHEM, LTD., Seoul (KR)

(72) Inventors: Ho-June Chi, Daejeon (KR); Jeong-O Mun, Daejeon (KR); Jin-Yong Park, Daejeon (KR); Sung-Won Seo, Daejeon (KR); Yoon-Koo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 99 days.

(21) Appl. No.: 16/461,167

(22) PCT Filed: Apr. 13, 2018

(86) PCT No.: PCT/KR2018/004356
§ 371 (c)(1),
(2) Date: May 15, 2019

(87) PCT Pub. No.: WO2018/199521
PCT Pub. Date: Nov. 1, 2018

(65) Prior Publication Data
US 2020/0067038 A1     Feb. 27, 2020

(30) Foreign Application Priority Data

Apr. 26, 2017  (KR) ........................ 10-2017-0053845

(51) Int. Cl.
*H01M 50/20*     (2021.01)
*H01M 10/613*    (2014.01)
(Continued)

(52) U.S. Cl.
CPC ......... *H01M 50/20* (2021.01); *H01M 10/613* (2015.04); *H01M 10/625* (2015.04); *H01M 10/655* (2015.04); *H01M 2220/20* (2013.01)

(58) Field of Classification Search
CPC .. H01M 10/613; H01M 10/625; H01M 50/20; H01M 10/655; H01M 2220/20;
(Continued)

(56) References Cited

U.S. PATENT DOCUMENTS

2010/0247997 A1 *  9/2010  Hostler ............. H01M 10/0468
                                                      429/120
2011/0183178 A1   7/2011  Sohn
(Continued)

FOREIGN PATENT DOCUMENTS

CN        203950846 U      11/2014
DE    10 2011 075 820 A1   11/2012
(Continued)

OTHER PUBLICATIONS

First Office Action dated Aug. 24, 2020, in corresponding Japanese Patent Application No. 2019-531137.
(Continued)

*Primary Examiner* — Barbara L Gilliam
*Assistant Examiner* — Jordan E Berresford
(74) *Attorney, Agent, or Firm* — Morgan, Lewis & Bockius LLP

(57) ABSTRACT

Disclosed is a battery module, which includes: a plurality of battery cells stacked side by side; a module case configured to accommodate the plurality of battery cells; a heatsink mounted to an outer side of the module case to cool the plurality of battery cells; and at least one heat transfer pad disposed in contact with the heatsink and the plurality of battery cells to penetrate the module case at least partially.

10 Claims, 5 Drawing Sheets

(51) Int. Cl.
   *H01M 10/625* (2014.01)
   *H01M 10/655* (2014.01)

(58) Field of Classification Search
   CPC ............. H01M 10/6551; H01M 50/10; H01M 50/116; Y02E 60/10; Y02T 10/70
   See application file for complete search history.

(56) References Cited

U.S. PATENT DOCUMENTS

| | | |
|---|---|---|
| 2011/0244299 A1 | 10/2011 | Guener et al. |
| 2012/0009455 A1* | 1/2012 | Yoon ................. H01M 10/6556 |
| | | 429/120 |
| 2014/0099527 A1 | 4/2014 | Seong et al. |
| 2014/0154549 A1 | 6/2014 | Wayne et al. |
| 2015/0072191 A1* | 3/2015 | Lee .................. H01M 10/6567 |
| | | 429/62 |
| 2016/0197331 A1* | 7/2016 | Mack ................ H01M 10/0413 |
| | | 429/82 |

FOREIGN PATENT DOCUMENTS

| | | | |
|---|---|---|---|
| JP | 2012-018915 A | 1/2012 | |
| JP | 2014-093244 A | 5/2014 | |
| JP | 2015-185535 A | 10/2015 | |
| KR | 10-2012-0100712 A | 9/2012 | |
| KR | 10-1307992 B1 | 9/2013 | |
| KR | 10-2013-0113740 A | 10/2013 | |
| KR | 10-2014-0110233 A | 9/2014 | |
| KR | 10-2014-0145250 A | 12/2014 | |
| KR | 20130123901 A * | 3/2015 | .......... H01M 10/613 |
| KR | 10-2016-0015615 A | 2/2016 | |
| KR | 10-2016-0071109 A | 6/2016 | |
| KR | 10-2017-0021122 A | 2/2017 | |
| KR | 10-2017-0021650 A | 2/2017 | |
| WO | 2010/066637 A1 | 6/2010 | |

OTHER PUBLICATIONS

International Search Report dated Aug. 6, 2018, issued in corresponding International Application No. PCT/KR2018/005356.
First Office Action dated Aug. 24, 2020, in corresponding Chinese Patent Application No. 201880004896.7.

* cited by examiner

BATTERY MODULE, BATTERY PACK INCLUDING BATTERY MODULE, AND VEHICLE INCLUDING BATTERY PACK

TECHNICAL FIELD

The present disclosure relates to a battery module, a battery pack including the battery module, and a vehicle including the battery pack.

The present application claims priority to Korean Patent Application No. 10-2017-0053845 filed on Apr. 26, 2017 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.6V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components.

A conventional battery module generally includes a plurality of battery cells stacked on one another, a module case for accommodating the plurality of battery cells, and a heatsink mounted to an outer side of the module case to cool the plurality of battery cells.

Here, the conventional battery module further includes an inner heat transfer member disposed in contact with the battery cells inside the module case to increase the heat transfer efficiency and an outer heat transfer member disposed opposite to the inner heat transfer member and disposed in contact with the heatsink. In the conventional battery module configured as above, the heat generated from the battery cells is transferred to the heatsink via the inner heat transfer member, the module case and the outer heat transfer member.

However, in the conventional battery module, when the heat of the battery cells is transferred to the heatsink, the heat passes through two heat transfer members, and the module case is also included in the path therebetween, thereby elongating the heat transfer path.

Moreover, in the conventional battery module, since the total module size is increased due to two heat transfer members with the module case being interposed therebetween, it is not easy to design a slim module, which is contrary to the recent slimming trend, and also it is disadvantageous in terms of energy density.

In addition, in the conventional battery module, the manufacturing cost is increased since two heat transfer members are mounted, thereby lowering the manufacturing efficiency.

Thus, there is a need to develop a battery module capable of solving the above problems, a battery pack including the battery module, and a vehicle including the battery pack.

DISCLOSURE

Technical Problem

Therefore, the present disclosure is directed to providing a battery module which may shorten a heat transfer path from battery cells to a heatsink, a battery pack including the battery module, and a vehicle including the battery pack.

In addition, the present disclosure is also directed to providing a battery module which may have a slimmer design suitable for the recent slimming trend and improve energy density, a battery pack including the battery module, and a vehicle including the battery pack.

Moreover, the present disclosure is also directed to providing a battery module which may reduce manufacturing cost and improve manufacturing efficiency, a battery pack including the battery module, and a vehicle including the battery pack.

Technical Solution

In one aspect of the present disclosure, there is provided a battery module, comprising: a plurality of battery cells stacked side by side; a module case configured to accommodate the plurality of battery cells; a heatsink mounted to an outer side of the module case to cool the plurality of battery cells; and at least one heat transfer pad disposed in contact with the heatsink and the plurality of battery cells and penetrating the module case at least partially.

One end of the at least one heat transfer pad may be disposed in contact with the plurality of battery cells, and the other end of the at least one heat transfer pad may protrude out of the module case to directly contact the heatsink.

The module case may have at least one pad penetration hole through which the other end of the at least one heat transfer pad passes.

The module case may be disposed to have a predetermined gap with the heatsink.

The at least one heat transfer pad may be composed of a single member.

The other end of the at least one heat transfer pad may have at least one protrusion.

The heatsink may be provided at a lower side of the module case, and the heat transfer pad may be provided in a single number and configured to connect the plurality of battery cells and the heatsink at a bottom portion of the module case.

The heatsink may be provided at both side surfaces of the module case, and the heat transfer pad may be provided in a pair and configured to connect the plurality of battery cells and the heatsink at both side surfaces of the module case.

The plurality of battery cells may be pouch-type secondary batteries.

In another aspect of the present disclosure, there is also provided a battery pack, comprising: at least one battery module according to the above embodiments; and a pack case configured to package the at least one battery module.

In another aspect of the present disclosure, there is also provided a vehicle, comprising at least one battery pack according to the above embodiments.

Advantageous Effects

According to various embodiments as above, it is possible to provide a battery module which may shorten a heat transfer path from battery cells to a heatsink, a battery pack including the battery module, and a vehicle including the battery pack.

In addition, according to various embodiments as above, it is possible to provide a battery module which may have a slimmer design suitable for the recent slimming trend and improve energy density, a battery pack including the battery module, and a vehicle including the battery pack.

Moreover, according to various embodiments as above, it is possible to provide a battery module which may reduce manufacturing cost and improve manufacturing efficiency, a battery pack including the battery module, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
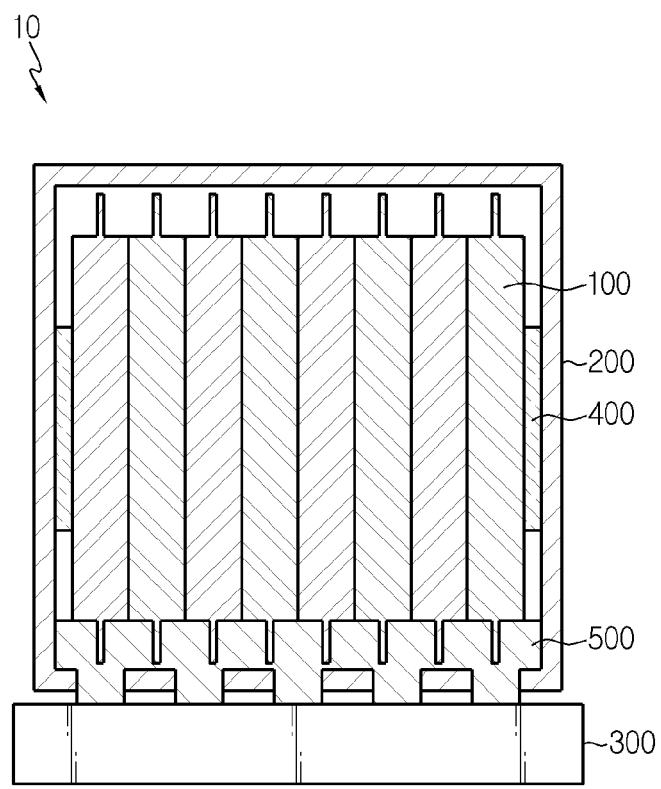
FIG. 1 is a diagram for illustrating a battery module according to an embodiment of the present disclosure.
Figure 2:
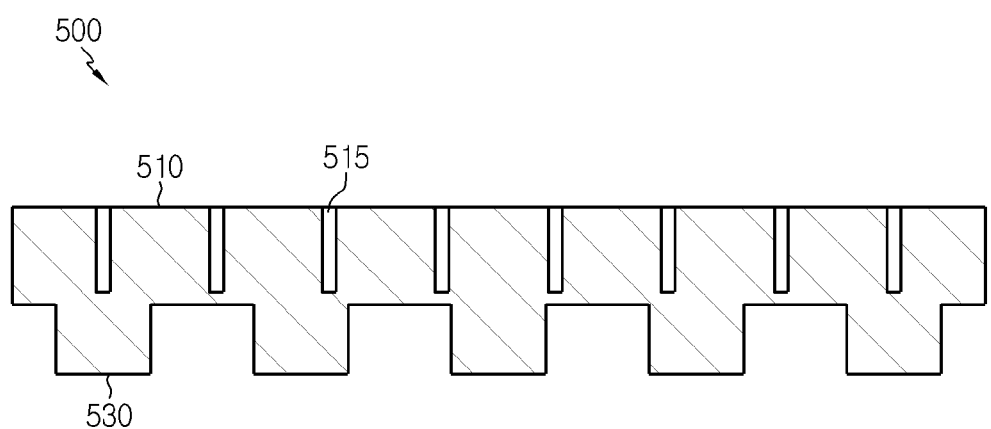
FIG. 2 is a diagram for illustrating a heat transfer pad of the battery module depicted in FIG. 1.
Figure 3:
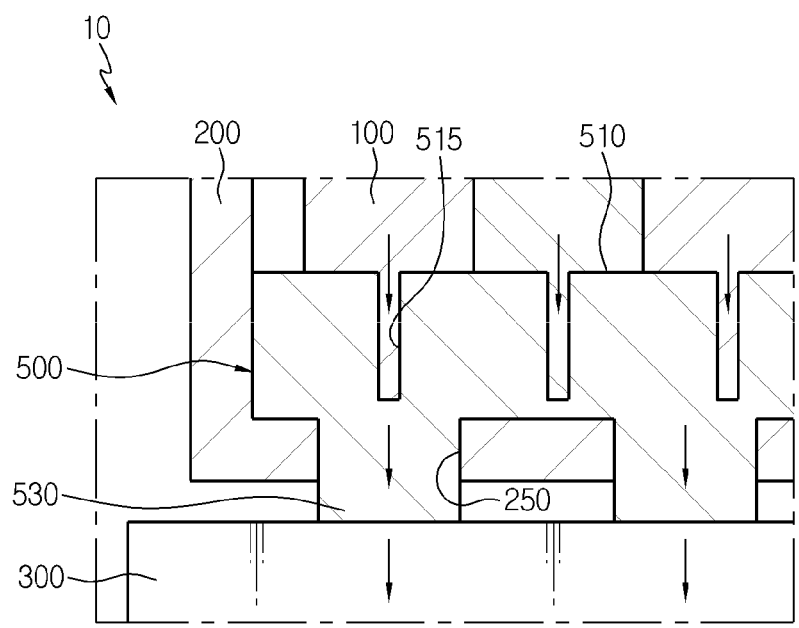
FIG. 3 is a diagram for illustrating essential parts of the battery module depicted in FIG. 1.

FIG. 1 is a diagram for illustrating a battery module according to an embodiment of the present disclosure, FIG. 2 is a diagram for illustrating a heat transfer pad of the battery module depicted in FIG. 1, and FIG. 3 is a diagram for illustrating essential parts of the battery module depicted in FIG. 1.

Referring to FIGS. 1 to 3, a battery module 10 may include a battery cell 100, a module case 200, a heatsink 300, a support member 400 and a heat transfer pad 500.

The battery cell 100 may be a pouch-type secondary battery and may be provided in plural. The plurality of battery cells 100 are stacked side by side in a lateral direction and may be electrically connected to each other.

The module case 200 may accommodate the plurality of battery cells 100. To this end, the module case 200 may have an accommodation space for accommodating the plurality of battery cells 100.

At least one pad penetration hole 250, or a plurality of pad penetration holes 250 in this embodiment, may be formed at a bottom portion of the module case 200 so that the other ends 530 of the heat transfer pad 500, explained later, may pass therethrough,.

The heatsink 300 is for cooling the plurality of battery cells 100 and may be provided at an outer side of the module case 200, or at a lower side of the module case 200 in this embodiment.

The support member 400 serves to support and buffer the plurality of battery cells 100 inside the module case 200 and may be provided in a pair to be disposed at left and right sides of an inner wall of the module case 200.

The heat transfer pad 500 is for transferring the heat generated from the plurality of battery cells 100 to the heatsink 300 and may be disposed in contact with the heatsink 300 and the plurality of battery cells 100.

The heat transfer pad 500 may be provided in a single number and may connect the plurality of battery cells 100 and the heatsink 300 at the bottom portion of the module case 200. Here, the heat transfer pad 500 may directly contact and connect to the heatsink 300 while passing through the module case 200 at least partially.

Specifically, one end 510 of the heat transfer pad 500 may be disposed in contact with the plurality of battery cells 100. Here, one end 510 of the heat transfer pad 500 may have a plurality of cell insertion holes 515 into which the plurality of battery cells 100 are inserted, so as to more stably contact and support the plurality of battery cells 100.

The other end 530 of the heat transfer pad 500 may protrude out of the bottom portion of the module case 200 and directly contact the heatsink 300. Here, the bottom portion of the module case 200 may be disposed to have a predetermined gap with the heatsink 300.

At least one protrusion may be formed at the other end 530 of the heat transfer pad 500. The at least one protrusion may have a dimple shape or the like and may secure the rigidity of the bottom portion of the module case 200 and further enhance the heat transfer efficiency.

In this embodiment, the heat transfer pad 500 is provided as a single member and directly connects the battery cells 100 and the heatsink 300 as described above. Thus, the heat transfer path may be significantly shortened, compared to a case where the heat transfer pad is provided in multi layers with the module case 200 being interposed therebetween.

Moreover, in this embodiment, since the heat transfer pad 500 is provided as a single member, the battery module 10 may have a slimmer structure suitable for the recent slimming trend and improve energy density. In addition, since the number of the heat transfer pad 500 may be reduced, it is possible to reduce the manufacturing cost of the battery module 10 and improve manufacturing efficiency.

Figure 4:
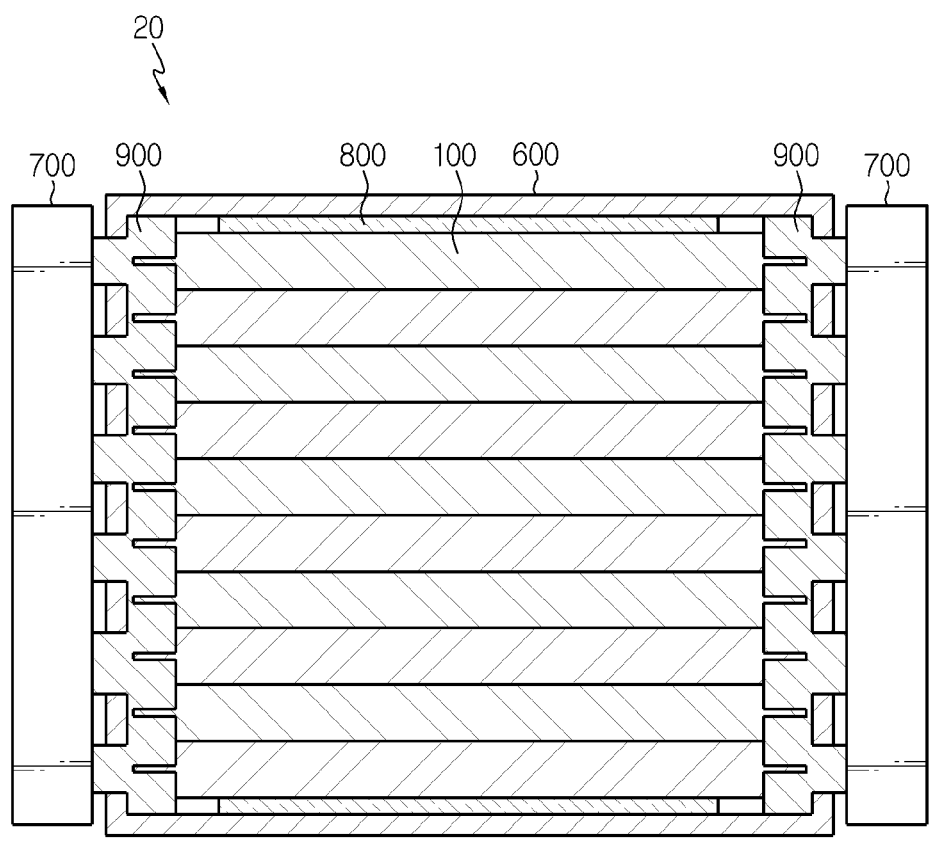
FIG. 4 is a diagram for illustrating a battery module according to another embodiment of the present disclosure.
Figure 5:
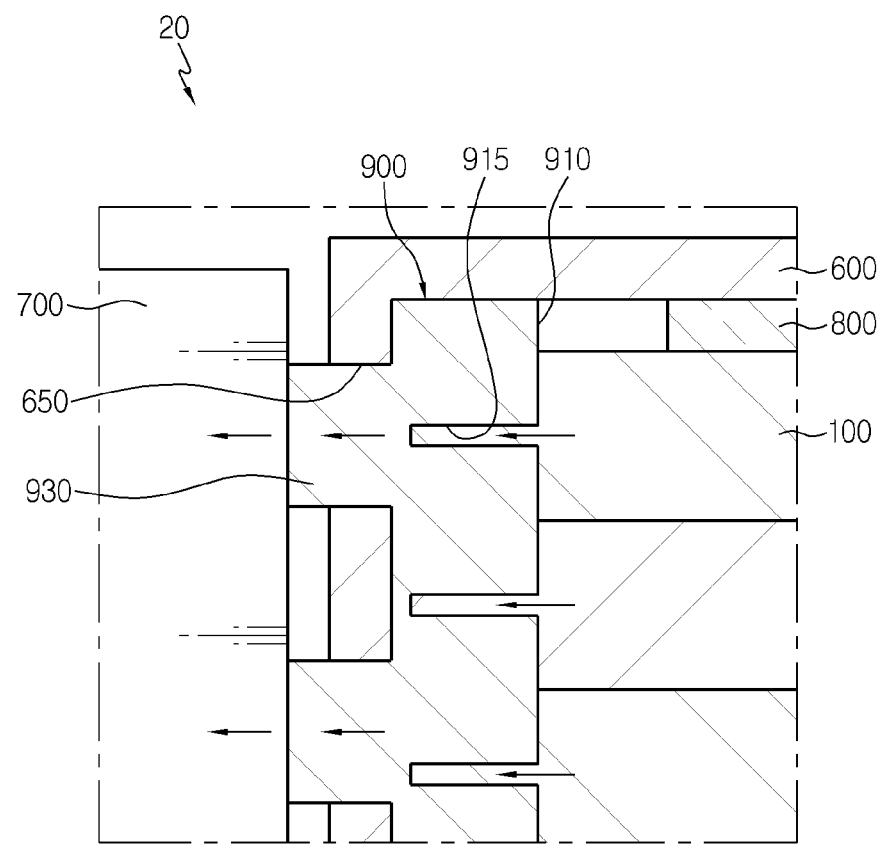
FIG. 5 is a diagram for illustrating essential parts of the battery module depicted in FIG. 4.

FIG. 4 is a diagram for illustrating a battery module according to another embodiment of the present disclosure, and FIG. 5 is a diagram for illustrating essential parts of the battery module depicted in FIG. 4.

The battery module 20 according to this embodiment is substantially identical or similar to the battery module 10 of the former embodiment, and thus the identical or similar components will not be repeatedly described in detail, but the different features will be mainly described.

Referring to FIGS. 4 and 5, the battery module 20 may include a plurality of battery cells 100, a module case 600, a heatsink 700, a support member 800 and a heat transfer pad 900.

The plurality of battery cells 100 may be stacked along a vertical direction inside the module case 600, explained later. A plurality of pad penetration holes 650 may be formed at both side surfaces of the module case 600 so that the other end 930 of each heat transfer pad 900, explained later, may pass therethrough. The heatsink 700 may be provided at an outer side of both side surfaces of the module case 600. The support member 800 is provided at upper and lower sides of an inner wall of the module case 600 to support the plurality of battery cells 100.

The heat transfer pad 900 may be provided in a pair and may connect the plurality of battery cells 100 and the heatsink 700 at both side surfaces of the module case 600.

A plurality of cell insertion holes 915 may be formed at one end 910 of the heat transfer pad 900 so that the plurality of battery cells 100 are inserted therein. The other end 930 of the heat transfer pad 900 may be disposed in contact with the heatsink 700 by protruding out of both side surfaces of the module case 600 through the plurality of pad penetration holes 650.

As described above, the heat transfer pad 900 of this embodiment may be applied to the structure where the battery cells 100 are stacked vertically inside the module case 600. At this time, similarly, it is possible to shorten to the heat transfer path, design the battery module 20 slimmer, and improve energy density and manufacturing efficiency.

Figure 6:
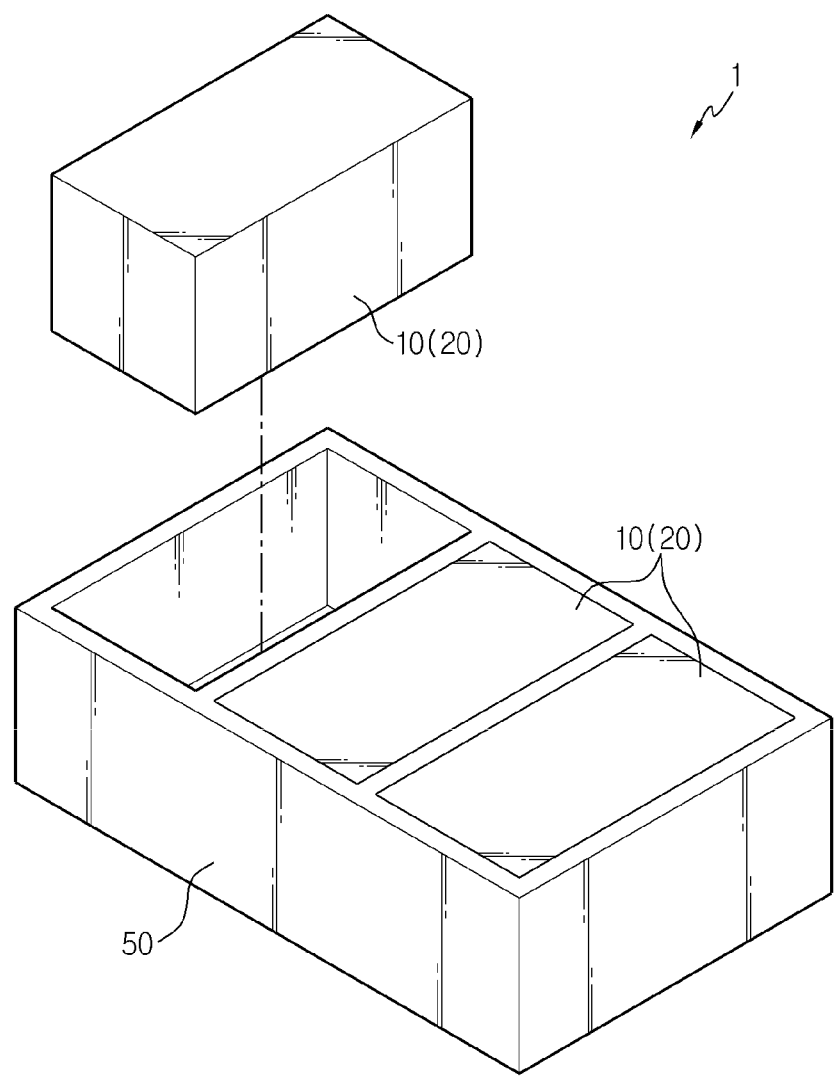
FIG. 6 is a diagram for illustrating a battery pack according to an embodiment of the present disclosure.

FIG. 6 is a diagram for illustrating a battery pack according to an embodiment of the present disclosure.

Referring to FIG. 6, a battery pack 1 may include at least one battery module 10, 20 according to the former embodiment and a pack case 50 for packaging the at least one battery module 10, 20.

The battery pack 1 may be provided to a vehicle as a fuel source of the vehicle. As an example, the battery pack 1 may be provided to an electric vehicle, a hybrid vehicle, and various other-type vehicles capable of using the battery pack 1 as a fuel source. In addition, the battery pack 1 may be provided in other devices, instruments or facilities such as an energy storage system using a secondary battery, in addition to the vehicle.

As described above, the battery pack 1 of this embodiment and devices, instruments or facilities such as a vehicle, which have the battery pack 1, include the battery module 10, 20 as described above, and thus it is possible to implement a battery pack 1 having all the advantages of the battery module 10, 20 described above, or devices, instruments, facilities or the like such as a vehicle, which have the battery pack 1.

According to various embodiments as above, it is possible to provide a battery module 10, 20 which may shorten a heat transfer path from the battery cells 100 to the heatsink 300, 700, a battery pack 1 including the battery module 10, 20, and a vehicle including the battery pack 1.

In addition, according to various embodiments as above, it is possible to provide a battery module 10, 20 which may have a slimmer design suitable for the recent slimming trend and improve energy density, a battery pack 1 including the battery module 10, 20, and a vehicle including the battery pack 1.

Moreover, according to various embodiments as above, it is possible to provide a battery module 10, 20 which may reduce manufacturing cost and improve manufacturing efficiency, a battery pack 1 including the battery module 10, 20, and a vehicle including the battery pack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising: a plurality of battery cells stacked side-by-side, each of the plurality of battery cells directly contacting at least one adjacent battery cell, each of the plurality of battery cells being a pouch-type battery; a module case configured to accommodate the plurality of battery cells; a heatsink mounted to an outer side of the module case, the heat sink being configured to cool the plurality of battery cells; and at least one heat transfer pad disposed in direct contact with both the heatsink and the plurality of battery cells, the at least one heat transfer pad penetrating the module case at least partially, the at least one heat transfer pad including a plurality of cell insertion holes in which respective tabs of respective ones of the plurality of battery cells are inserted, such that a body of each of the plurality of battery cells is outside of the cell insertion holes, wherein the cell insertion holes are on a same plane as the outer side of the module case to which the heatsink is mounted, wherein the module case has at least one pad penetration hole that passes through the outer side of the module case to which the heatsink is mounted, wherein one end of the at least one heat transfer pad is disposed inside the module case to be in direct contact with the plurality of battery cells;

and wherein the other end of the at least one heat transfer pad passes through the at least one pad penetration hole to protrude to an outside of the module case to directly contact the heatsink.

2. The battery module according to claim 1, wherein:
the module case has a plurality of pad penetration holes through which the other end of the at least one heat transfer pad passes; and
there are more cell insertion holes than pad penetration.

3. The battery module according to claim 1, wherein the module case is disposed to have a predetermined gap with the heatsink.

4. The battery module according to claim 1, wherein the at least one heat transfer pad is composed of a single member.

5. The battery module according to claim 1, wherein the other end of the at least one heat transfer pad has at least one protrusion.

6. The battery module according to claim 1, wherein:
the heatsink is provided at a lower side of the module case;
the heat transfer pad is provided in a single number; and
the heat transfer pad is configured to connect the plurality of battery cells and the heatsink at a bottom portion of the module case.

7. The battery module according to claim 1, wherein:
the heatsink is provided at both side surfaces of the module case;
the heat transfer pad is provided in a pair; and
the heat transfer pad is configured to connect the plurality of battery cells and the heatsink at both side surfaces of the module case.

8. The battery module according to claim 1, wherein the plurality of battery cells are secondary batteries.

9. A battery pack, comprising:
at least one battery module as defined in claim 1; and
a pack case configured to package the at least one battery module.

10. A vehicle, comprising at least one battery pack as defined in claim 9.

* * * * *